(12) United States Patent
Maguire (10) Patent No.: US 9,722,223 B1
(45) Date of Patent: Aug. 1, 2017

(54) BATTERY PACK RETENTION ASSEMBLY AND METHOD

(71) Applicant: FORD GLOBAL TECHNOLOGIES, LLC, Dearborn, MI (US)

(72) Inventor: Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/058,643

(22) Filed: Mar. 2, 2016

(51) Int. Cl.
*B60K 1/04* (2006.01)
*H01M 2/10* (2006.01)

(52) U.S. Cl.
CPC ............. *H01M 2/1083* (2013.01); *B60K 1/04* (2013.01); *B60K 2001/0438* (2013.01); *B60Y 2306/01* (2013.01); *H01M 2220/20* (2013.01)

(58) Field of Classification Search
CPC ................... H01M 2/1083; B60K 1/04; B60K 2001/0438; B60K 2001/0494; B60K 2001/0461; B60K 2001/0472
See application file for complete search history.

(56) References Cited

U.S. PATENT DOCUMENTS

| | | | | | |
|---|---|---|---|---|---|
| 3,988,170 | A * | 10/1976 | Koch | ............... | H01M 2/0245 220/23.4 |
| 4,365,681 | A * | 12/1982 | Singh | ............... | B60K 1/04 105/51 |
| 5,484,667 | A * | 1/1996 | Sahli | ............... | H01M 2/1083 180/68.5 |
| 5,585,205 | A * | 12/1996 | Kohchi | ............... | B60K 1/04 180/65.1 |
| 5,760,569 | A * | 6/1998 | Chase, Jr. | ............... | B60K 1/04 104/34 |
| 6,007,216 | A * | 12/1999 | Donnelly | ............... | B60Q 1/2611 362/186 |
| 7,712,563 | B2 * | 5/2010 | Niebuhr | ............... | B60K 1/04 180/311 |
| 7,740,981 | B2 * | 6/2010 | Hashida | ............... | H01M 2/1077 429/158 |
| 7,828,099 | B2 * | 11/2010 | Heckeroth | ............... | B60K 1/00 180/2.2 |
| 7,836,989 | B2 * | 11/2010 | Reed | ............... | B60R 16/04 180/68.5 |
| 8,146,694 | B2 * | 4/2012 | Hamidi | ............... | B60K 1/04 180/68.5 |
| 8,453,778 | B2 * | 6/2013 | Bannier | ............... | B60K 1/04 180/68.5 |
| 8,534,398 | B2 * | 9/2013 | van der Stappen | ...... | B60K 1/04 180/65.1 |
| 8,608,230 | B2 * | 12/2013 | Young | ............... | B60K 1/04 296/187.02 |

(Continued)

FOREIGN PATENT DOCUMENTS

WO 2014204614 12/2014

*Primary Examiner* — Hau Phan
*Assistant Examiner* — Jacob Meyer
(74) *Attorney, Agent, or Firm* — Carlson, Gaskey & Olds, P.C.

(57) ABSTRACT

An exemplary battery pack retention assembly includes a bracket, a protrusion configured to transition from a disengaged position with the bracket to an engaged position with the bracket in response to movement of a battery pack enclosure relative to a portion of vehicle.

16 Claims, 7 Drawing Sheets

(56) References Cited

U.S. PATENT DOCUMENTS

| | | | | |
|---|---|---|---|---|
| 8,689,918 B2* | 4/2014 | Yu | H01M 2/1005 | |
| | | | 180/68.5 | |
| 8,776,926 B2* | 7/2014 | Auer | B60K 1/04 | |
| | | | 180/68.5 | |
| 8,795,876 B2* | 8/2014 | Thomas | H01M 2/1083 | |
| | | | 180/65.29 | |
| 9,065,103 B2* | 6/2015 | Straubel | H01M 2/105 | |
| 9,070,923 B2* | 6/2015 | Yu | B60S 5/06 | |
| 9,139,074 B2* | 9/2015 | Jarocki | B60K 1/04 | |
| 9,156,340 B2* | 10/2015 | Van Den Akker | B60K 1/04 | |
| 9,216,718 B2* | 12/2015 | Ojima | B60S 5/06 | |
| 9,227,601 B2* | 1/2016 | Corfitsen | B60L 11/1822 | |
| 9,359,742 B2* | 6/2016 | Adachi | H01G 11/10 | |
| 2007/0221423 A1* | 9/2007 | Chang | A61G 5/045 | |
| | | | 180/68.5 | |
| 2009/0166116 A1 | 7/2009 | Kiya et al. | | |
| 2010/0145717 A1* | 6/2010 | Hoeltzel | B60K 1/04 | |
| | | | 705/1.1 | |
| 2012/0111654 A1* | 5/2012 | Origuchi | B60K 1/04 | |
| | | | 180/68.5 | |
| 2012/0164496 A1* | 6/2012 | Lachenmeier | B60K 1/04 | |
| | | | 429/61 | |
| 2012/0223113 A1* | 9/2012 | Gaisne | H01M 2/1083 | |
| | | | 224/538 | |
| 2012/0321381 A1* | 12/2012 | Ohgitani | B60K 1/04 | |
| | | | 403/376 | |
| 2012/0326107 A1* | 12/2012 | Ojima | B60K 1/04 | |
| | | | 254/89 R | |
| 2013/0037337 A1* | 2/2013 | Auer | B60K 1/04 | |
| | | | 180/68.5 | |
| 2013/0095360 A1* | 4/2013 | Niedzwiecki | H01M 2/1077 | |
| | | | 429/99 | |
| 2013/0104361 A1* | 5/2013 | Corfitsen | B60L 11/1822 | |
| | | | 29/402.08 | |
| 2014/0196966 A1* | 7/2014 | Ohgitani | B60K 1/04 | |
| | | | 180/68.5 | |
| 2015/0197144 A1* | 7/2015 | Jarocki | B60K 1/04 | |
| | | | 180/232 | |

* cited by examiner

BATTERY PACK RETENTION ASSEMBLY AND METHOD

TECHNICAL FIELD

This disclosure relates generally to securing a battery pack to an electrified vehicle and, more particularly, to securing the battery pack to an underbody of the electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electrified vehicles (HEVs), plug-in hybrid electrified vehicles (PHEVs), fuel cell vehicles (FCVs), and battery electrified vehicles (BEVs).

The traction batteries of electrified vehicles can include a battery pack having several individual battery arrays within an otherwise open area of a battery pack enclosure. Some vehicles secure the battery pack to an underbody of the vehicle. Packaging space beneath the underbody is limited, especially in height.

Some manufacturers attach a battery pack to the underbody using fasteners extending from a vertical bottom of the battery pack enclosure across the open area to the underbody. To seal the fasteners from the open area, the fasteners are positioned within a conduit. Such attachment strategies can be complex.

SUMMARY

A battery pack retention assembly according to an exemplary aspect of the present disclosure includes, among other things, a bracket, and a protrusion configured to transition from a disengaged position with the bracket to an engaged position with the bracket in response to movement of a battery pack enclosure relative to a portion of vehicle.

In a further non-limiting embodiment of the foregoing assembly, the protrusion in the engaged position with the bracket holds the battery pack enclosure relative to the vehicle.

In a further non-limiting embodiment of any of the foregoing assemblies, the protrusion includes a neck portion extending along an axis from a surface to a head portion that is enlarged relative to the neck portion. A portion of the bracket is positioned between the head and the surface when the protrusion is in the engaged position.

In a further non-limiting embodiment of any of the foregoing assemblies, the neck portion is received within a slot of the bracket when the protrusion is in the engaged position with the bracket.

In a further non-limiting embodiment of any of the foregoing assemblies, the bracket includes a floor and a flange extending from the bracket. The flange is angled relative to the floor. The slot extends from the floor through the flange. The flange is configured to bend as the protrusion moves through the slot to the engaged position with bracket.

In a further non-limiting embodiment of any of the foregoing assemblies, the protrusion extends along an axis from a surface and includes a post and at least one tang extending from the post in a direction transverse to the axis. The bracket is positioned between the at least one tang and the surface when the protrusion is in the engaged position.

In a further non-limiting embodiment of any of the foregoing assemblies, the tang is received within an opening of the bracket when the protrusion is in the engaged position.

In a further non-limiting embodiment of any of the foregoing assemblies, the bracket provides a pocket having a floor, and the protrusion includes a tab spaced from a surface. The floor of the pocket is positioned between the tab and the surface when the protrusion is in the engaged position.

In a further non-limiting embodiment of any of the foregoing assemblies, the protrusion extends from the battery pack enclosure, and the bracket is directly attached to an underbody of an electrified vehicle.

In a further non-limiting embodiment of any of the foregoing assemblies, the protrusion extends from an underbody of an electrified vehicle, and the bracket is directly attached to the battery pack enclosure.

In a further non-limiting embodiment of any of the foregoing assemblies, the battery pack enclosure has a plurality of sidewalls and a plurality of endwalls, the sidewalls and endwalls extending from a tray to a lid, the sidewalls and endwalls establishing a perimeter of the battery pack enclosure. The protrusion and the bracket are within the perimeter.

In a further non-limiting embodiment of any of the foregoing assemblies, the bracket or the protrusion is directly attached to the lid.

An electrified vehicle assembly according to an exemplary aspect of the present disclosure includes, among other things, a support structure of an electrified vehicle, a battery pack enclosure, a retention assembly that can transition from a disengaged position to an engaged position to secure the battery pack to the support structure. The retention assembly can transition from the disengaged position to the engaged position in response to movement of the battery pack relative to the support structure.

In a further non-limiting embodiment of the foregoing assembly, the battery pack enclosure has a plurality of sidewalls and a plurality of endwalls, the sidewalls and endwalls extending from a tray to a lid. The sidewalls and endwalls establish a perimeter of the battery pack enclosure. The retention assembly is within the perimeter.

In a further non-limiting embodiment of any of the foregoing assemblies, the assembly includes a plurality of mechanical fasteners securing the battery pack enclosure to the support structure. The plurality of mechanical fasteners positioned outside the perimeter.

A method of securing a battery pack to an electrified vehicle according to an exemplary aspect of the present disclosure includes, among other things, moving a battery pack relative to an electrified vehicle to transition a retention feature from a disengaged position to an engaged position. The retention feature in the engaged position secures the battery pack to a portion of the electrified vehicle.

In a further non-limiting embodiment of the foregoing method, the retention feature includes a protrusion and a bracket. The protrusion contacts a pocket floor of the bracket when the retention feature is in the engaged position.

In a further non-limiting embodiment of any of the foregoing method, the portion is an underbody of the electrified vehicle, and the moving is a moving of the battery pack relative to the underbody.

In a further non-limiting embodiment of the foregoing method, the moving is a horizontal movement of the battery pack relative to the underbody.

In a further non-limiting embodiment of the foregoing method, the moving is a vertical movement of the battery pack relative the underbody.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to securing a battery pack to an electrified vehicle. The retention assemblies used for the securing are sealed from an interior of the battery pack. The retention assemblies can be moved from a disengaged position to an engaged position by moving the battery pack relative to a portion of the electrified vehicle.

Figure 1:
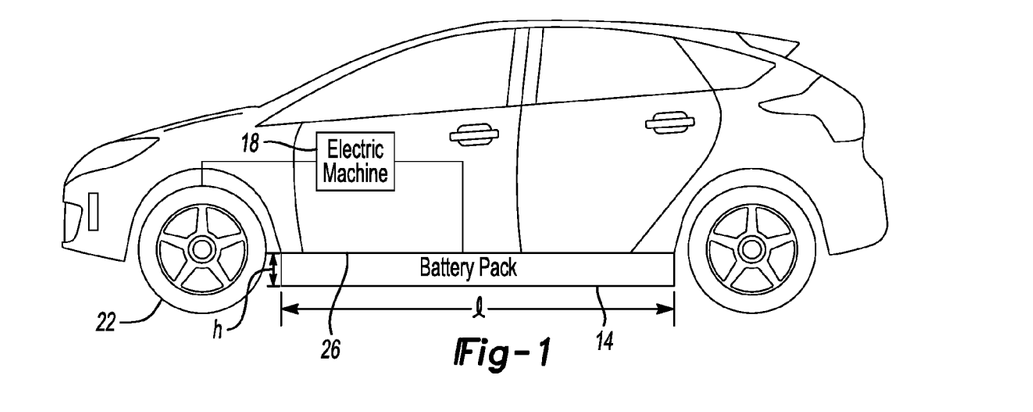
FIG. 1 illustrates a side view of an example electrified vehicle.

Referring to FIG. 1, an example electrified vehicle 10 includes a battery pack 14 that powers an electric machine 18. The vehicle includes wheels 22 driven by the electric machine 18. The electric machine 18 receives electric power from the battery pack 14 and converts the electric power to torque to drive the wheels 22. The example battery pack 14 is considered a relatively high voltage (e.g., 60 $V_{DC}$, 30 $V_{AC}$) battery.

The example electrified vehicle 10 is an all-electric vehicle. In other examples, the vehicle 10 is a hybrid electric vehicle, which selectively drives wheels using torque provided by an internal combustion engine instead of, or in addition to, the electric machine 18.

The electrified vehicle 10 includes an underbody 26. The example battery pack 14 is secured to the underbody 26. The exemplary battery pack 14 has a length 1 that is greater than its cross-car width. In other examples, the length 1 can be less than, or equal to, the cross-car width. The example battery pack 14 approaches a cross-car width that spans the opposing body rails of the electrified vehicle 10. The exemplary battery pack 14 has a relatively low height h to maintain appropriate clearances.

Figure 2:
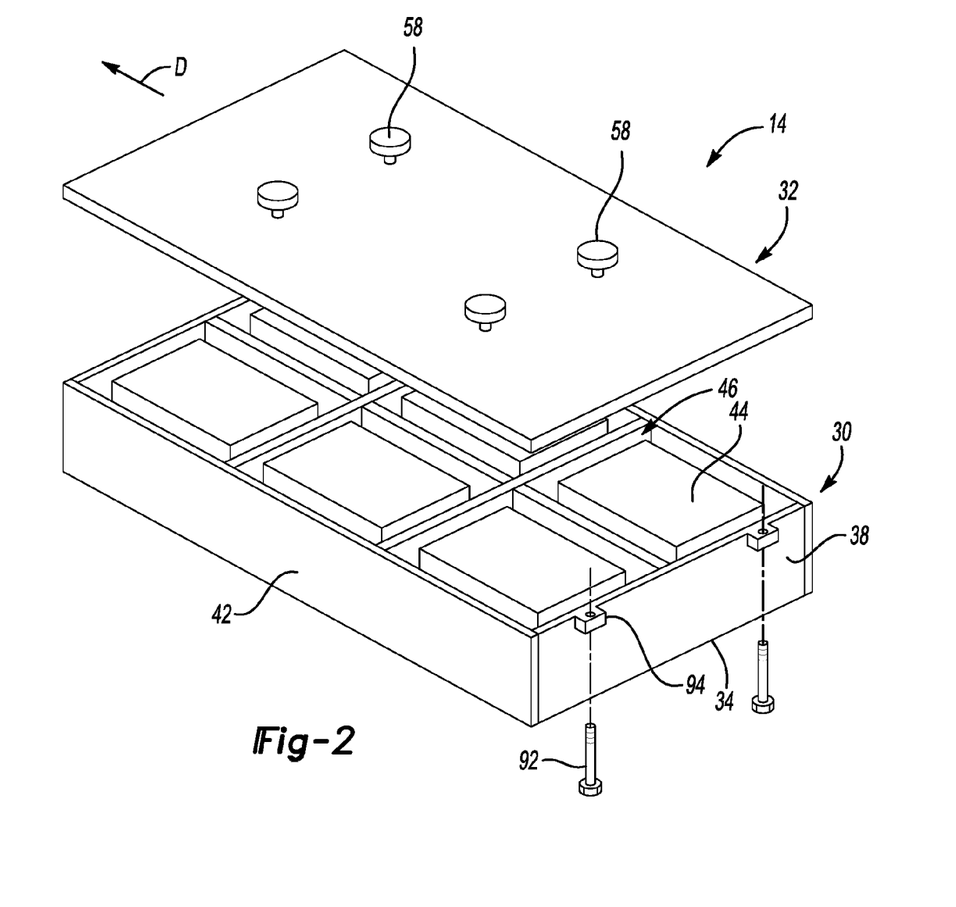
FIG. 2 illustrates a partially exploded view of a battery pack from the electrified vehicle of FIG. 1.

Referring to FIG. 2, the exemplary battery pack 14 generally includes a tray 30 and a cover 32 providing an enclosure. The tray 30 includes a bottom 34, a pair of endwalls 38, and a pair of sidewalls 42. The cover 32 secures to upwardly facing surfaces of the endwalls 38 and the sidewalls 42. The endwalls 38 and the sidewalls 42 extend from the bottom 34 to the cover 32 when the cover 32 is secured. In other examples, the enclosure 30 could be formed with the walls on the cover, some of the walls on the cover and some of the walls on the tray, or the walls being separate from both the tray and the cover. That is, many techniques could be used to form the enclosure 30, and the enclosure 30 geometry is not limited to the geometries of the enclosure 30 shown in FIG. 2.

The battery pack 14 includes a plurality of battery cell arrays 44 within an interior area 46 of the enclosure. The battery cell arrays 44 store energy and can selectively provide power to the electric machine 18.

Referring now to FIG. 3-6 with continued reference to FIGS. 1 and 2, a battery pack retention assembly 50 secures the battery pack 14 to the underbody 26 of the electrified vehicle 10. In this example, the battery pack retention assembly 50 includes a bracket 54 and a protrusion 58. The underbody 26 is an example type of support structure provided by the electrified vehicle 10. In other example, the battery pack 14 could be secured to another support structure of the electrified vehicle 10, such as a seat back, the firewall, the hood, or the roof.

The bracket 54 includes an attachment portion 60, a wall 62, and a floor 66. The wall 62 extends downwardly from the attachment portion 60 to the floor 66 such that the floor 66 is spaced vertically from the attachment portion 60 and the underbody 26. Spacing the floor 66 from the attachment portion 60 and the underbody 26 provides a pocket 70 within the bracket 54. The floor 66 includes a slot 74 that opens to a leading edge 78 of the pocket 70. In another example, the floor 66 and the bracket 54 are both raised vertically relative to the attachment portion 60 to provide a pocket 70. That is, there are many ways to provide the pocket 70 using the bracket 54.

The attachment portion 60 can be attached to the underbody 26 at a location corresponding to a cross member, a tunnel runner, a soap dish, or some other structurally reinforced areas of the underbody. The bracket 54 can be separate from the underbody 26 as shown or could be an integral portion of the underbody 26.

In this example, the protrusion 58 is secured directly to the cover 32. The protrusion 58 could be secured to the cover 32 with a weld, clinch bond, adhesive, or some other type of fastening strategy.

The protrusion 58 includes a neck portion 82 and a head portion 86 such that the protrusion 58 has a "T" shape. The neck portion 82 extends from a surface of the cover 32 to the head portion 86. The head portion 86 is enlarged relative to the neck portion 82.

The neck portion 82 can extend from the head portion 86 through an aperture 96 in the cover 32 to a base 98 that is enlarged relative to the neck portion 82. The base 98 helps to prevent the protrusion 58 from withdrawing from the aperture 96 in the cover 32. The base 98 helps to clinch the protrusion 58 to the cover 32.

The base 98 and the head portion 86 are on opposing sides of the cover 32. The neck portion 82 outside the aperture 96 can be enlarged relative to the neck portion 82 within the aperture to further strengthen the protrusion 58 relative to the cover 32.

The interfaces between the protrusion 58 and the cover 32 are sealed. The sealing prevents communication of fluid, such as air or gas, between the interior area 46 of the battery pack 14 and an exterior of the battery pack 14.

An adhesive seal could be used, for example. In such an example, the adhesive seal can both seal and bond the protrusion 58 to the cover 32. The seal could be also be based on interference between the protrusion 58 and the cover 32.

Although the example protrusion 58 is shown as separate from the cover 32 other arrangements a possible. For example, the protrusion 58 could be cast with the cover 32 if the cover 32 is cast, or could be molded with the cover 32 if the cover 32 is molded.

Figure 3:
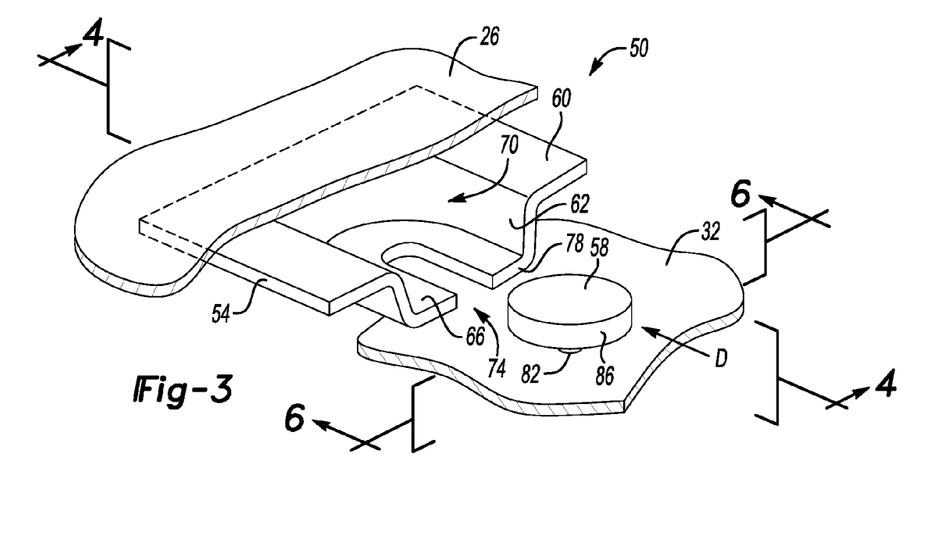
FIG. 3 illustrates a perspective view of a battery pack retention assembly according to an exemplary embodiment, and is shown in a disengaged position along with selected portions of the battery pack and an underbody of the electrified vehicle of FIG. 1.
Figure 4:
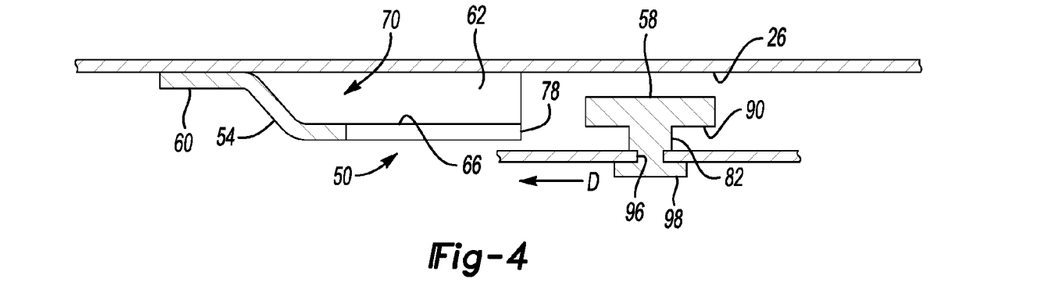
FIG. 4 illustrates a section view of the battery pack retention assembly of FIG. 3 at line 4-4.
Figure 5:
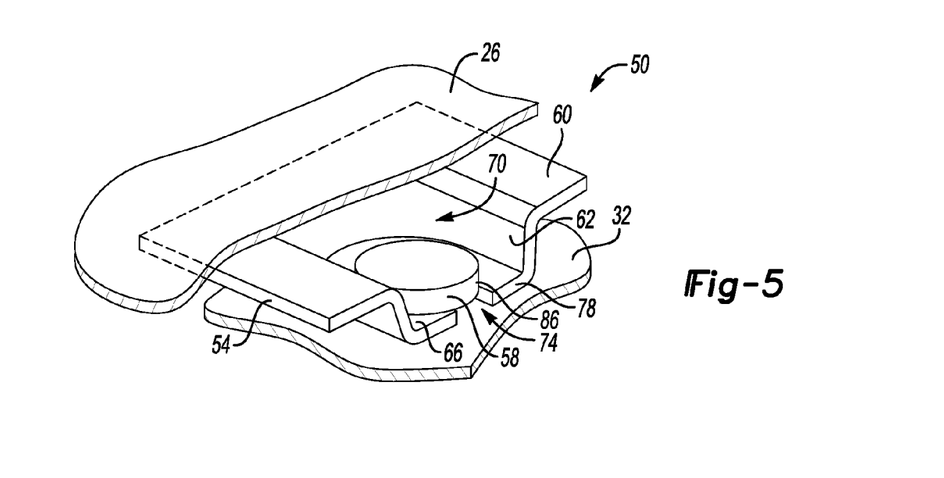
FIG. 5 illustrates a perspective view of the battery pack retention assembly of FIG. 3 in an engaged position along with the selected portions of the battery pack and the underbody of the electrified vehicle of FIG. 1.

The battery pack retention assembly 50 is shown in a disengaged position in FIGS. 3 and 4 and an engaged position in FIG. 5. The battery pack retention assembly 50 can transition from the disengaged position to the engaged position by moving the battery pack 14 in a direction D relative to a portion of the electrified vehicle 10, which is the underbody 26 in this example.

In this example, prior to securing the battery pack 14 to the electrified vehicle 10, the cover 32 is attached to the tray 30. The battery pack 14 is then vertically raised to position the battery pack 14 near the underbody 26. The battery pack 14 is then moved in a direction D to position the neck portion 82 within the slot 74. The direction D is generally horizontal relative to ground. If the battery pack 14 were secured to another support structure of the electrified vehicle, the battery pack 14 could slide in directions other than horizontal relative to ground to position the neck portion 82 within the slot 74. For example, if the battery pack 14 is secured to a dash panel at the engine bay, the battery pack 14 can slide down toward ground to position the neck portion 82 within the slot 74.

More specifically, the direction D is a forward direction relative to the vehicle 10 such that the slot 74 opens toward a rear of the vehicle 10. Orienting the slot 74 in this way can allow the retention assembly 50, when in the engaged position, to transfer loads in front and side collisions, as well as many loads induced by gravity and vibration.

When the neck portion 82 is within the slot 74, contact between a downwardly facing surface 90 of the head portion 86 and the floor 66 of the bracket 54 prevents the battery pack 14 from moving downward away from the underbody 26.

One or more mechanical fasteners 92 could be used to prevent the neck portion 82 from withdrawing from the slot 74. The mechanical fastener could be received within an aperture of a flange 94 extending outwardly away from the endwall 38. The mechanical fastener could extend through the aperture to engage a threaded or unthreaded bore in the underbody 26. Engaging the underbody 26 with a fastener extending through the flange 94 prevents the battery pack 14 from moving in a direction opposite the direction D, which could potentially cause the battery pack retention assembly 50 to move from the engaged position to a disengaged position.

Flanges having apertures to receive fasteners could also extend from the other endwall 38. Flanges having apertures to receive fasteners could also extend from one or both of the sidewalls 42. In some examples, a flange having an aperture is not used, and another technique is used to prevent movement of the battery pack 14 from the installed position. For example, clip in fasteners, press fit fasteners, fasteners extending through the enclosure wall thickness from above the floor pan, etc.

Figure 6:
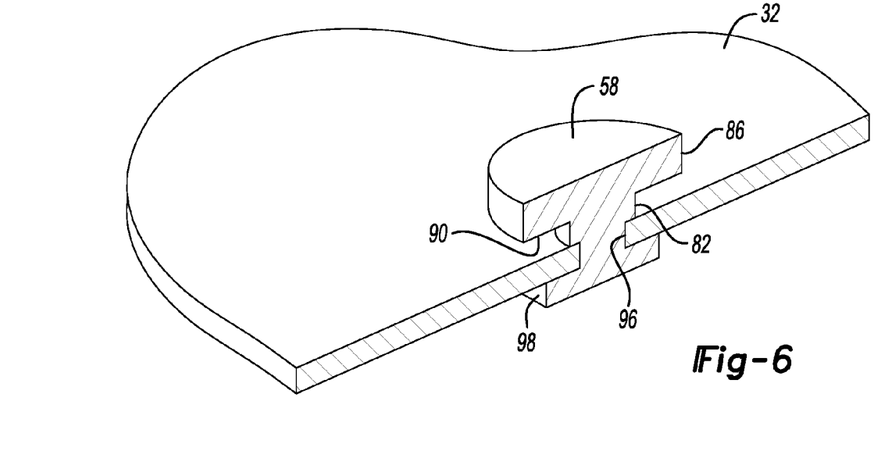
FIG. 6 illustrates a section view at line 6-6 in FIG. 3.
Figure 6A:
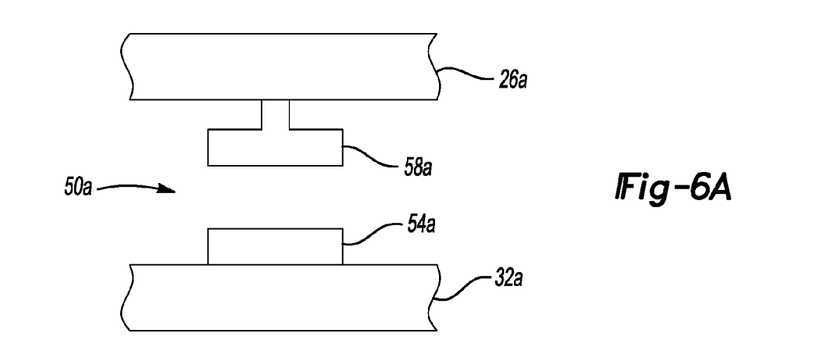
FIG. 6A illustrates a highly schematic view of a battery pack retention assembly according to yet another exemplary embodiment.

In the example retention assembly 50, the protrusion 58 extends directly from the cover 32. Further, the bracket 54 is secured directly to the underbody 26. In another example, shown schematically in FIG. 6A, a protrusion 58a of a retention assembly 50a extends directly from an underbody 26a, and a bracket 54a of the retention assembly 50a is secured directly to a cover 32a.

Figure 7:
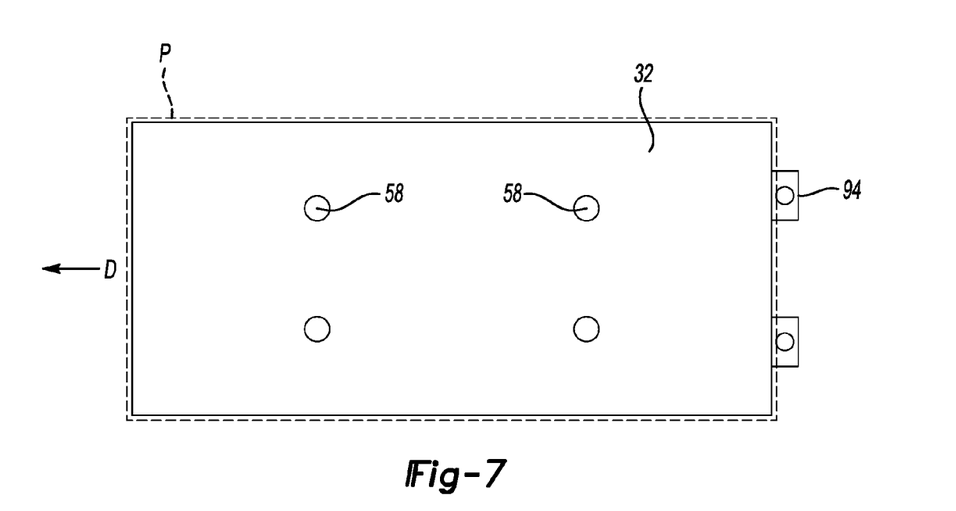
FIG. 7 illustrates a top view of the battery pack of FIG. 2.

Referring now FIG. 7, a top view of the battery pack 14 shows the protrusions 58 of the battery pack retention assembly 50 extending from the cover 32. The flanges 94 extending outwardly from the endwall 38 are also shown.

In this example, the endwalls 38 and the sidewalls 42 of the battery pack generally define an outer perimeter P of the battery pack 14. When the battery pack retention assembly 50 is in the engaged position as shown in FIGS. 1 and 5, the retention assembly 50 is positioned within the perimeter P as is the cover 32.

The battery pack retention assemblies 50, being within the perimeter P, can desirably prevent areas of the battery pack 14 within the perimeter P from bowing or sagging away from the underbody 26. Battery packs having relatively long lengths, widths, or both can be particularly prone to bowing and sagging within the perimeter if not secured. That is, because the battery pack 14 has a relatively low height and relatively long distance between opposing endwalls and opposing side walls supporting a large distributed load from the battery cell arrays 44, compensation for static deflection can be required. If the battery pack 14 is permitted to sag, the battery pack 14 may risk damage and have an undesired clearance to ground surfaces.

The example battery pack 14 of FIGS. 3 to 7 includes protrusions 58 of four separate retention assemblies 50 within the perimeter P. In other examples, less than four or more than four retention assemblies 50 are used within the perimeter P. If more than one retention assembly 50 is used within the perimeter P, the retention assemblies 50 can be disposed along a common horizontal axis, or arranged in some other way. In some examples, the retention assemblies 50 are positioned within the perimeter P according to how the stiffness of the battery pack 14 is distributed. That is, if the system stiffness of mass distribution is not symmetrical, the retention assemblies can be distributed asymmetrically within the perimeter P. The retention assemblies 50 could be positioned in areas prone to sagging, for example.

The cover 32 is positioned vertically close to the underbody 26 when installed. As can be appreciated, accessing areas between the cover 32 and the underbody 26 with a tool, such as a torque tool, can be difficult. Since the battery pack retention assembly 50 can move from the disengaged position to the engaged position in response to movement of the battery pack 14, accessing the battery pack retention assembly 50 with a tool in the area between the battery pack 14 and the underbody 26 is not necessary.

The flanges 94, in contrast to the retention assembly 50 are outside the perimeter. Areas outside the perimeter P are less burdensome to access with a tool, such as a torque tool. Thus, the fasteners 92 can be secured with a torque tool.

Figures 8, 8A:
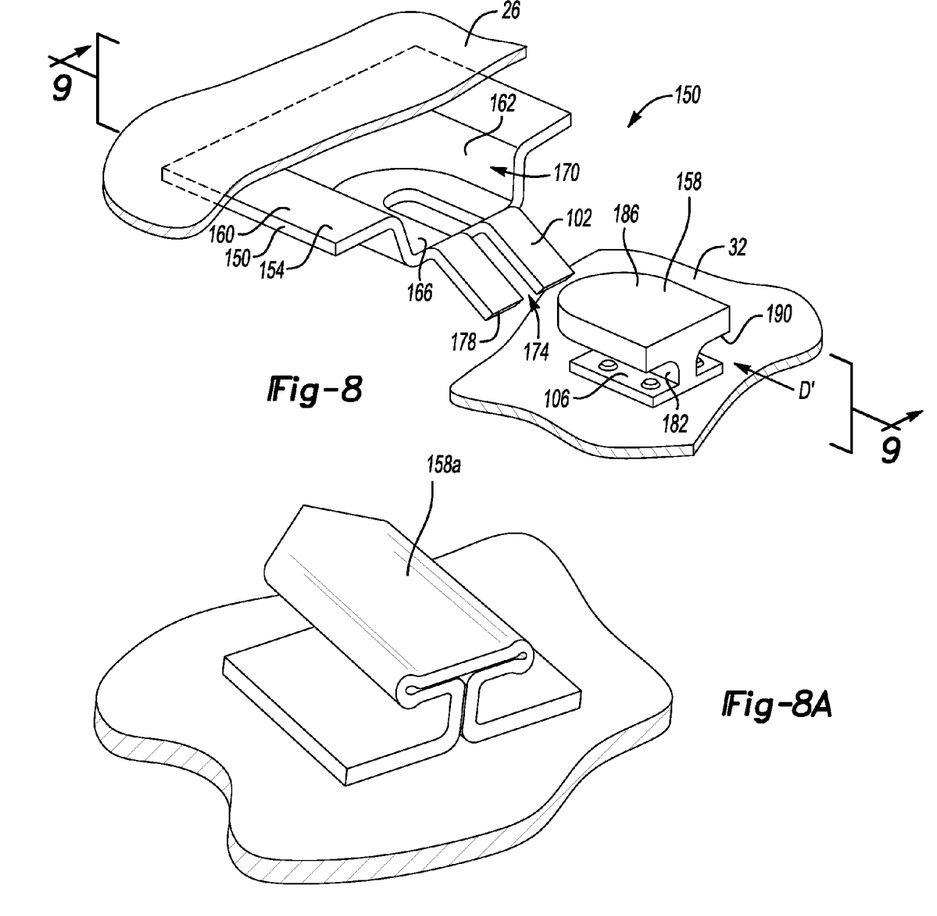
FIG. 8 illustrates a perspective view of a battery pack retention assembly according to another exemplary embodiment, and is shown in a disengaged position along with selected portions of the battery pack and an underbody of the electrified vehicle of FIG. 1.
FIG. 8A illustrates a variation of a protrusion of the battery pack retention assembly of FIG. 8.
Figure 9:
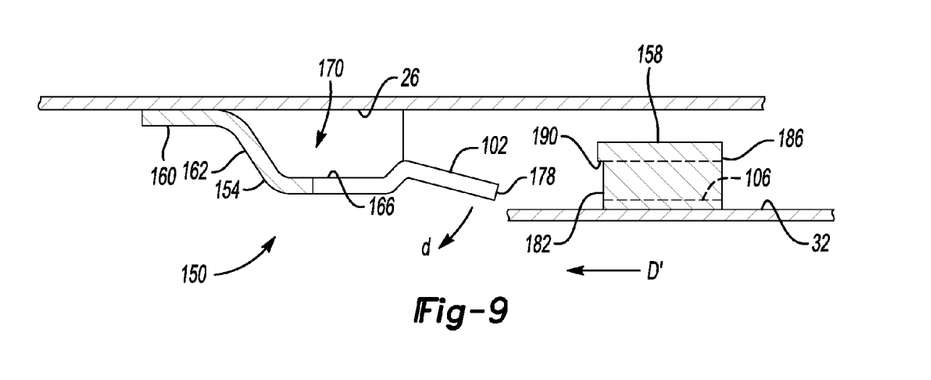
FIG. 9 illustrates a section view of the battery pack retention assembly of FIG. 8 at line 9-9.

Referring now to FIGS. 8 to 9 with continuing reference to FIGS. 1 and 2, another example battery pack retention assembly 150 includes a bracket 154 with an attachment portion 160, a wall 162, and a floor 166. The wall 162 extends downwardly from the attachment portion 160 to the floor 166 such that the floor 166 is spaced vertically from the attachment portion 160 and the underbody 26. Spacing the floor 166 from the attachment portion 160 and the underbody 26 provides a pocket 170 within the bracket 154.

The bracket 154 further includes a flange 102 or lead-in tongue extending from the floor 166. As the flange 102 extends from the floor 166, the flange 102 bends upward toward the underbody 26 and then downwards away from the underbody 26. The flange 102 thus provides a ramp-like structure or bump.

A slot 174 extends through the floor 166 and through the flange 102. The slot 174 is open to a leading edge 178 of the bracket 154. To further facilitate ease of assembly, the two inside corners of the leading edge 178 could be chamfered (not shown) to promote the neck portion 182 finding the slot 174 in addition to the flange 102 promotion of the head portion 186 getting above the floor 166.

The retention assembly 150 further includes a protrusion 158 having a neck portion 182 and a head portion 186 that is enlarged relative to the neck portion 182. The neck portion 182 is about the same width as the slot 174. The head portion 186 is wider than the slot 174.

The example protrusion 158 further includes a base 106 that is fastened directly to an outwardly facing surface of the cover 32. The base 106 can be welded to the cover 32, for example.

In some examples, the protrusion 158 can be a protrusion 158a can be a folded sheet metal bracket as shown in FIG. 8A.

To move the protrusion 158 from a disengaged position to an engaged position with the bracket 154, the protrusion 158 is moved into the slot in a direction D' until a downwardly facing surface 190 of the head portion 186 is positioned against the floor 166. In the example retention assembly 150, or another retention assembly of this disclosure, the floor 166 could be designed to have an interference fit with the surface 190. The resulting spring fit of the protrusion 158 within the pocket 170 can reduce undesirable looseness in the retention assembly 150 when in the engaged position.

As the protrusion 158 moves through the portion of the slot 174 within the flange 102, the downwardly facing surface 190 contact the flange 102 causing the flange 102 to deflect generally downward in a direction d. After the protrusion 158 moves into the portion of the slot 174 provided by the floor 166, the flanges 102 return to the position of FIGS. 8 and 9. The flange 102 can provide some support to the battery pack 14 during decking and compensate for a sag in the battery pack 14 due to gravity when moving the retention feature 150 to the engaged position.

The flange 102 can further include a chamfer at the leading edge 178 to help guide the protrusion 158 in to the slot 174 during installation if the protrusion 158 is slightly vertically misaligned relative to the flange 102.

The ramp-like structure or bump of the flange 102 can prevent the protrusion 158 from backing out of the slot 174 in a direction opposite the direction D'. The ramping of the flange 102 can also provide a tactile and audible feedback to an operator to indicate that the protrusion 158 is properly positioned within the engaged position. As can be appreciated, the flange 102 would resist movement of the protrusion 158 into the pocket 170. When the protrusion is in the pocket 170, the flange 102 would no longer resist this movement and installation efforts would decrease.

In the example, of FIGS. 8 and 9, the protrusion 158 extends from the cover 32, and the bracket 154 is secured to the underbody 26. In another example, the protrusion 158 could extend from the underbody 26 and the bracket 154 could be secured to the cover 32.

Figure 10:
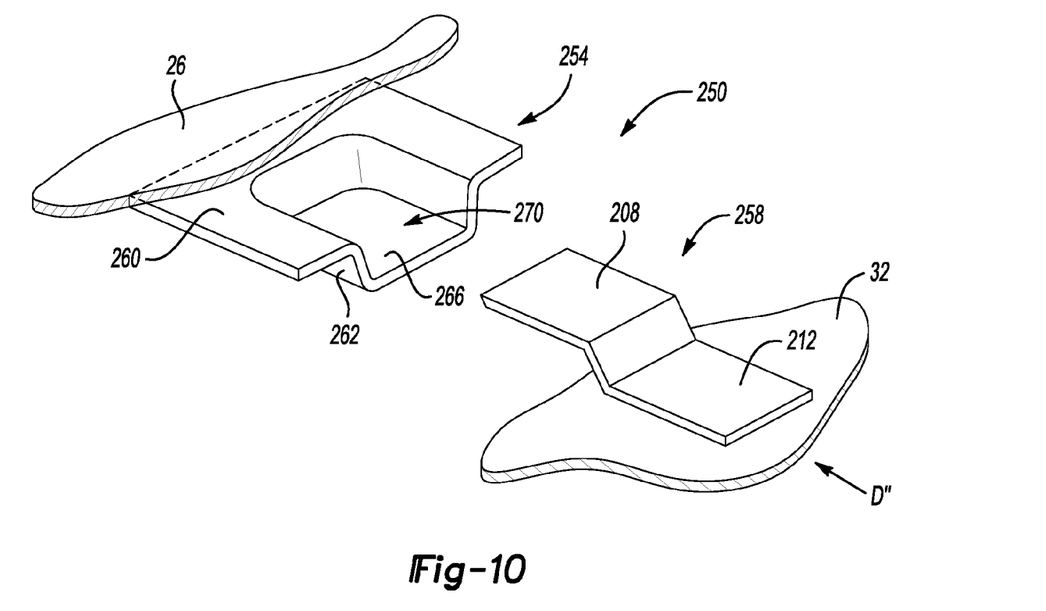
FIG. 10 illustrates a perspective view of a battery pack retention assembly according to yet another exemplary embodiment, and is shown in a disengaged position along with selected portions of the battery pack and an underbody of the electrified vehicle of FIG. 1.
Figure 11:
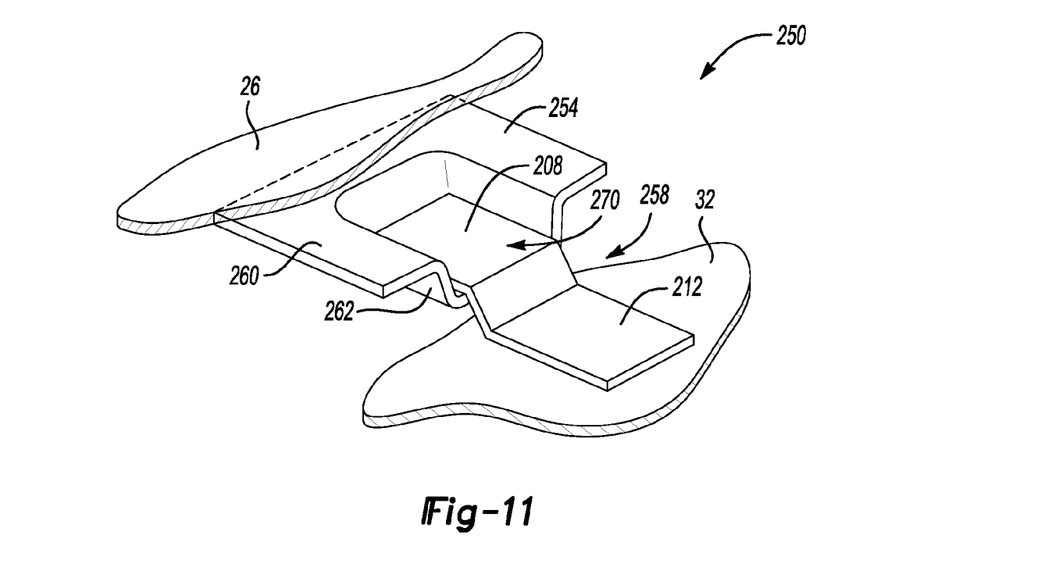
FIG. 11 illustrates the battery pack retention assembly of FIG. 10 in an engaged position along with the selected portions of the battery pack and an underbody of the electrified vehicle of FIG. 1.

Referring now to FIGS. 10 and 11 with continuing reference to FIGS. 1 and 2, another example retention assembly 250 includes a bracket 254 having an attachment portion 260 secured directly to an underbody 26. Walls 262 extend downwardly from the attachment portion 260 to a floor 266 to provide a pocket 270. The bracket 254 can be stamped and attached to the underbody 26. The bracket 254 could be an integral portion of the underbody 26.

A protrusion 258 includes a flange 208 and an attachment portion 212 secured to the cover 32. The flange 208 is spaced vertically from an outwardly facing surface of the cover 32 and the attachment portion 212. Movement of the battery pack 14 can move the protrusion in a direction D" from the engaged position of FIG. 10 to the engaged position of FIG. 11. In the engaged position, the flange 208 is positioned against the floor 266 of the bracket 254 to block vertical movement of the battery pack 14 downward away from the underbody 26. A leading edge of the flange 208 could include a chamfer to facilitate movement of the protrusion into the pocket 207. The leading edge of the floor 266 could instead or additionally include a chamfer (not shown).

In the example, of FIGS. 10 and 11, the protrusion 258 extends from the cover 32, and the bracket 254 is secured to the underbody 26. In another example, the protrusion 258 could extend from the underbody 26 and the bracket 254 could be secured to the cover 32.

Figure 12:
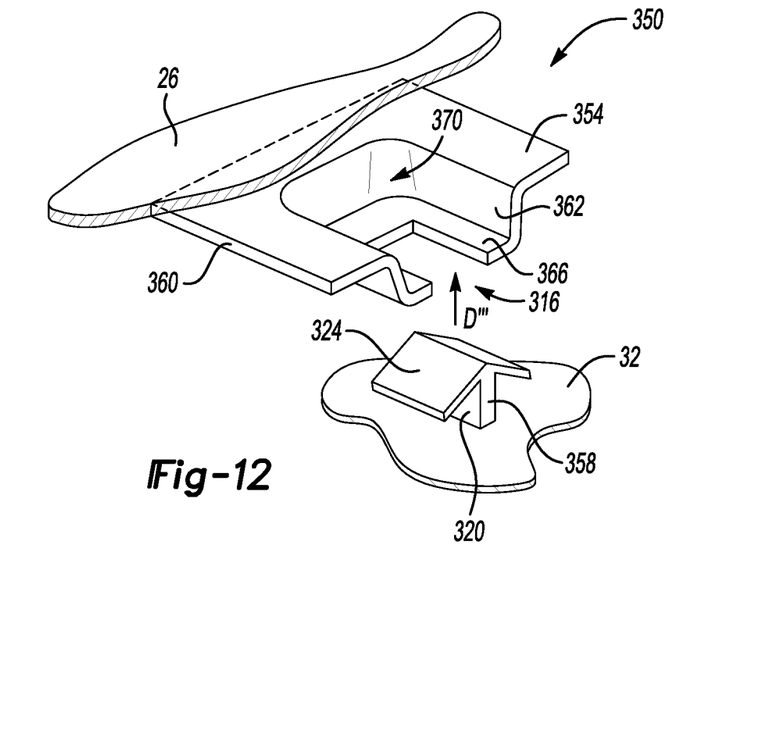
FIG. 12 illustrates a perspective view of a battery pack retention assembly according to yet another exemplary embodiment, and show in a disengaged position along with selected portions of the battery pack and an underbody of the electrified vehicle of FIG. 1.
Figure 13:
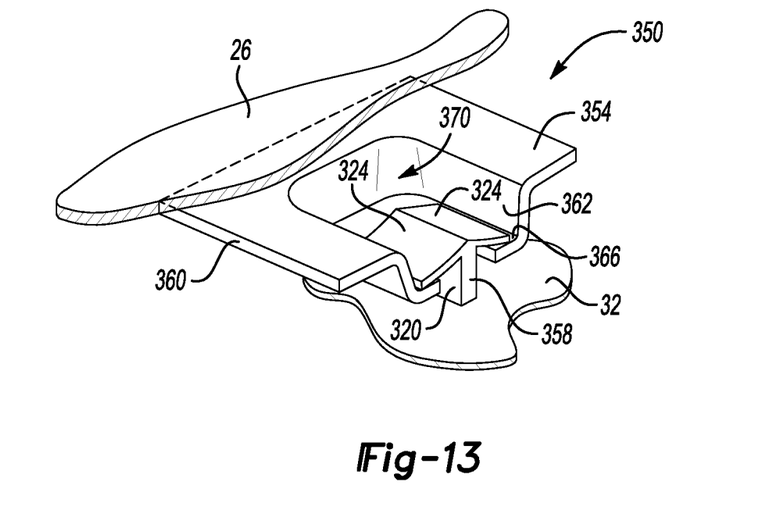
FIG. 13 illustrates the battery pack retention assembly of FIG. 12 in an engaged position.

Referring now to FIGS. 12 and 13 with continuing reference to FIGS. 1 and 2, yet another example retention assembly 350 includes a bracket 354 having an attachment portion 360 secured directly to an underbody 26. Walls 362 extend downwardly from the attachment portion 360 to a floor 366 to provide a pocket 370. An opening 316 is provided within the floor 366. The opening 316 could be a slot as shown or an enclosed hole.

The retention assembly 350 further includes a protrusion 358 having a post 320 and one or more tangs 324. The post 320 extending along an axis from an outwardly facing surface of the cover 32 to the tangs 324, which each extend outwardly from the post 320.

To move the retention assembly 350 from the disengaged position of FIG. 12 to the engaged position of FIG. 13, the protrusion 358 is inserted and moved vertically upwards toward the underbody 26 in a direction D''' into the opening 316. As the protrusion 358 initially moves through the opening 316, the sides of the opening 316 push the tangs 324 inward toward the post 320. After sufficient movement of the battery pack 14 toward the underbody 26, the tangs 324 move past the sides of the opening 316 and spring back outwardly past the sides. Contact between the tangs 324 and the floor 366 then prevents the protrusion 358 from withdrawing from the bracket 354.

In the example of FIGS. 12 and 13, the protrusion 358 extends from the cover 32, and the bracket 354 is secured to the underbody 26. In another example, the protrusion 358 could extend from the underbody 26 and the bracket 354 could be secured to the cover 32.

Notably, the example of FIGS. 12 and 13 can move to an engaged position purely via vertical movement. To move the protrusion 358, the protrusion 358 may be moved horizontally to move the protrusion 358 out of the opening 316.

Figure 14:
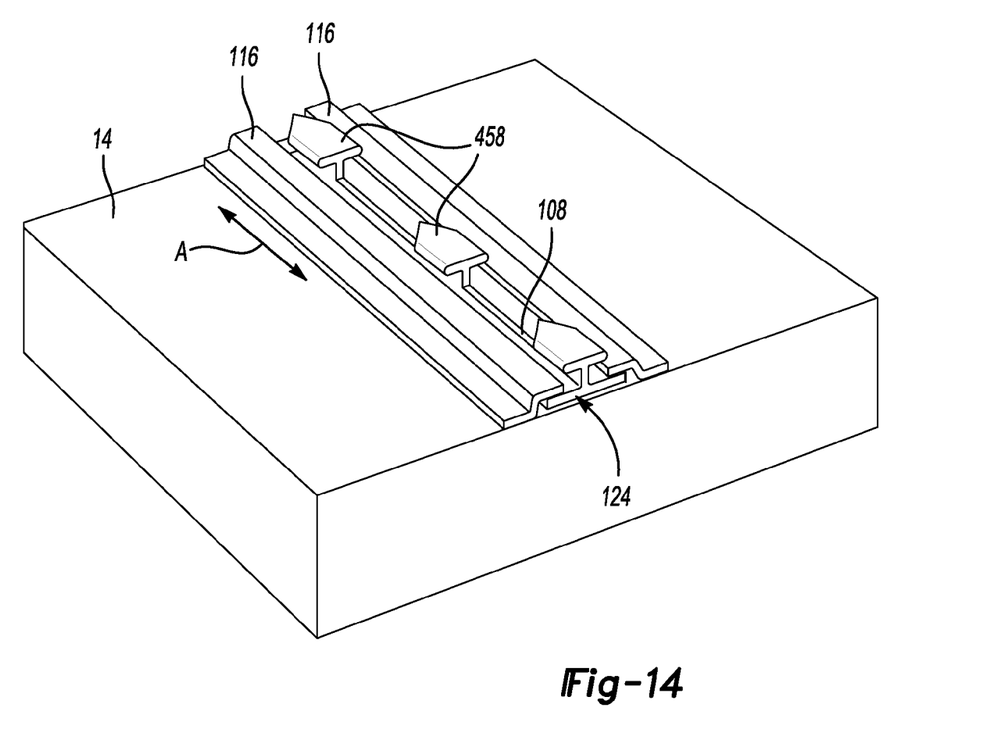
FIG. 14 illustrates a plurality of protrusions of a battery pack retention assembly according to yet another exemplary embodiment.

Referring now to FIG. 14 with continuing reference to FIGS. 1 and 2, yet another example retention assembly includes a protrusion assembly 108 having plurality of protrusions 458 extending from a common protrusion base 112.

Runner flanges 116 are secured to an upper surface of the battery pack 14. The protrusion assembly 108 is held within a protrusion assembly channel 124 provided between the upper surface of the battery pack 14 and raised portions of the runner flanges 116. The protrusion assembly 108 can move back and forth within the channel 124 along axis A. The movement of the protrusion assembly 108 along the axis A is movement relative to the battery pack 14 and the runner flanges 116. That is, the protrusion assembly 108 is not directly secured to the battery pack 14.

When the protrusion assembly 108 is used to secure the battery pack 14 to the underbody 26, the battery pack 14 can first be moved vertically upward toward the underbody 26. The protrusion assembly 108 and runner flanges 116 move vertically upward toward the underbody 26 together with the battery pack 14. After vertical positioning, the protrusion assembly 108 can be moved horizontally within the channel 124 along the axis A to move the protrusions 458 into engaged positions within corresponding brackets of the underbody 26 (such as the brackets of the FIG. 8 embodiment).

When the protrusions 458 are in the engaged position, a locking tab or fastener can be used to hold the position of the protrusion assembly 108 within the channel 124. The locking tab or fastener can prevent the protrusion assembly 108 from shifting within the channel 124 and moving the protrusions 458 from engaged positions. The locking tab or fastener could secure to the underbody 26, an end of the runner flanges 116, the battery pack 14, or some combination of these.

In any of the examples of this disclosure, the brackets can be separate from the underbody as shown or could be an integral portion of the underbody. The brackets, the protrusions, or both can include chamfered areas to facilitate movement to the engaged positions and avoid alignment issues.

In any of the examples of this disclosure, the retention assemblies could comprises an insert to mitigate squeaks and rattles. The inserts could be an ultra-high molecular weight polyethylene, for example.

Features of the disclosed examples include retention assemblies that are sealed from an interior of the battery pack without requiring complex additional structures. The retention assemblies further do not require substantial fastening operations or tools to move the retention assemblies from a disengaged to an engaged position. Instead, the exemplary retention assemblies can transition from the disengaged position to an engaged position in response to relative movement of the battery pack relative to a portion of the electrified vehicle. Further, significant clearances are not required to engage the retention assemblies. The retention assembly can be moved from the disengaged position to an engaged position through an effectively blind operation. This retention assembly also avoids the need for attachments which pass through the interior portion of the battery pack to retain these central areas of the battery pack. And any additional seals to accommodate such pass through attachments are avoided.

In this disclosure, like reference numerals designate like elements where appropriate, and reference numerals with the addition of one-hundred or multiples thereof generally designate modified elements. The modified elements substantially incorporate the same features and benefits of the corresponding modified elements, expect where stated otherwise.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack retention assembly, comprising:
a bracket;
a protrusion configured to transition from a disengaged position with the bracket to an engaged position with the bracket in response to movement of a battery pack enclosure relative to a portion of a vehicle,
wherein the bracket and the protrusion provide a retention assembly to secure the battery pack enclosure to the portion; and
one or more mechanical fasteners securing the battery pack enclosure to the portion and positioned outside a perimeter established by a plurality of enclosure sidewalls and end walls of the battery pack enclosure, the bracket and the protrusion both positioned laterally within the perimeter when the protrusion is in the engaged position.

2. The battery pack retention assembly of claim 1, wherein the protrusion or the bracket extends directly from the battery pack enclosure, and the protrusion in the engaged position with the bracket holds the battery pack enclosure relative to the vehicle.

3. The battery pack retention assembly of claim 1, wherein the protrusion includes a neck portion extending along an axis from a surface to a head portion that is enlarged relative to the neck portion, at least a portion of the bracket positioned between the head and the surface when the protrusion is in the engaged position.

4. The battery pack retention assembly of claim 3, wherein the neck portion is received within a slot of the bracket when the protrusion is in the engaged position with the bracket.

5. The battery pack retention assembly of claim 4, wherein the bracket includes a floor and a flange extending from the bracket, the flange is angled relative to the floor, wherein the slot extends from the floor through the flange, the flange configured to bend as the protrusion moves through the slot to the engaged position with bracket.

6. The battery pack retention assembly of claim 1, wherein the protrusion extends along an axis from a surface and includes a post and at least one tang extending from the post in a direction transverse to the axis, the bracket positioned between the at least one tang and the surface when the protrusion is in the engaged position.

7. The battery pack retention assembly of claim 6, wherein the protrusion is received within an opening of the bracket when the protrusion is in the engaged position.

8. The battery pack retention assembly of claim 1, wherein the bracket provides a pocket having a floor, and the protrusion includes a tab spaced from a surface, the floor of the pocket positioned between the tab and the surface when the protrusion is in the engaged position.

9. The battery pack retention assembly of claim 1, wherein the protrusion extends from the battery pack enclosure, and the bracket is directly attached to an underbody of an electrified vehicle.

10. The battery pack retention assembly of claim 1, wherein the protrusion extends from an underbody of an electrified vehicle, and the bracket is directly attached to the battery pack enclosure.

11. The battery pack retention assembly of claim 1, wherein the battery pack enclosure has a plurality of sidewalls and a plurality of endwalls, the sidewalls and endwalls extending from a tray to a lid, the sidewalls and endwalls establishing a perimeter of the battery pack enclosure, wherein the protrusion and the bracket are within the perimeter.

12. The battery pack retention assembly of claim 11, wherein the bracket or the protrusion is directly attached to the lid.

13. The battery pack retention assembly of claim 1, wherein the movement of the battery pack enclosure relative to a portion of the vehicle is a movement in a forward direction relative to the vehicle in a direction away from a rear of the vehicle.

14. A battery pack assembly, comprising:
a bracket;
a protrusion configured to transition from a disengaged position with the bracket to an engaged position with the bracket in response to movement of a battery pack enclosure relative to a portion of a vehicle;
a support structure of an electrified vehicle, and the battery pack enclosure, wherein the bracket and the protrusion provide a retention assembly that can transition from the disengaged position to the engaged position to secure the battery pack enclosure to the support structure, wherein the retention assembly can transition from the disengaged position to the engaged position in response to movement of the battery pack enclosure relative to the support structure,
wherein the battery pack enclosure has a plurality of sidewalls and a plurality of endwalls, the sidewalls and endwalls extending from a tray to a lid, the sidewalls and endwalls establishing a perimeter of the battery pack enclosure, wherein the retention assembly is within the perimeter; and
a plurality of mechanical fasteners securing the battery pack enclosure to the support structure, the plurality of mechanical fasteners positioned outside the perimeter.

15. A battery pack assembly, comprising:
a retention assembly having a bracket and a protrusion, the protrusion configured to transition from a disengaged to an engaged position with the bracket in response to movement of an enclosure of a battery pack relative to a support structure of a vehicle, the retention assembly positioned laterally within a perimeter of the enclosure established by a plurality of enclosure sidewalls and end walls; and
one or more mechanical fasteners configured to secure the enclosure to the support structure from a position outside the perimeter.

16. The battery pack retention assembly of claim 15, wherein the bracket is secured to the support structure and the protrusion extends directly from the enclosure.

* * * * *